US006339320B1

(12) United States Patent
Spremo et al.

(10) Patent No.: US 6,339,320 B1
(45) Date of Patent: Jan. 15, 2002

(54) POWER TRANSFORMER FOR A SWITCHED MODE POWER SUPPLY, ESPECIALLY FOR STUD WELDING DEVICES

(75) Inventors: Danilo Spremo, Niederfischbach; Martin Perschke, Castrop-Rauxel, both of (DE)

(73) Assignee: Nelson Stud Welding, Inc., Elyria, OH (US)

( * ) Notice: Subject to any disclaimer, the term of this patent is extended or adjusted under 35 U.S.C. 154(b) by 0 days.

(21) Appl. No.: 09/555,991

(22) PCT Filed: Dec. 9, 1998

(86) PCT No.: PCT/DE98/03623

§ 371 Date: Sep. 13, 2000

§ 102(e) Date: Sep. 13, 2000

(87) PCT Pub. No.: WO99/31681

PCT Pub. Date: Jun. 24, 1999

(30) Foreign Application Priority Data

Dec. 17, 1997 (DE) ........................................ 197 56 188

(51) Int. Cl.[7] ........................ H01F 29/00; H01F 27/30; H02M 1/00

(52) U.S. Cl. ........................ 323/355; 363/147; 336/200

(58) Field of Search ................................ 323/355, 224, 323/271, 282; 336/65, 192, 83, 200, 232, 217, 234; 363/21, 147, 144

(56) References Cited

U.S. PATENT DOCUMENTS 4,972,573 A * 11/1990 Yamamoto et al. ......... 336/213
5,019,952 A * 5/1991 Smolenski et al. ........... 363/16
5,521,573 A * 5/1996 Inoh et al. .................. 336/180

* cited by examiner

*Primary Examiner*—Rajnikant B. Patel
(74) *Attorney, Agent, or Firm*—Howard & Howard

(57) ABSTRACT

The invention relates to a power transformer for a switching power supply, particularly for a stud welding device, comprising a closed ring-shaped core and a primary and secondary winding arranged thereon, with the primary winding consisting of at least one primary package (7) and the secondary winding consisting of at least one secondary package (9), with the primary packages (7) containing at least one primary lamella and the secondary packages containing at least one secondary lamella, which are configured as electrical conductors spirally wound in one plane, and with the primary and secondary packages (7, 9) being alternately laminated one on top of the other in planes that are parallel to one another.

21 Claims, 6 Drawing Sheets

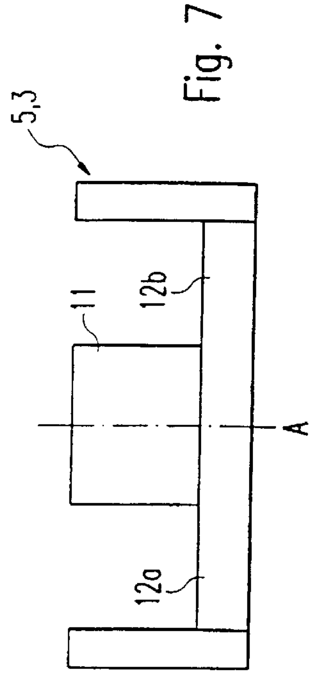
Fig. 7
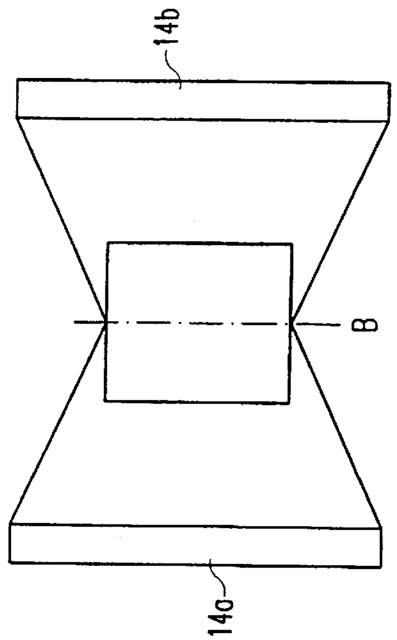
Fig. 8
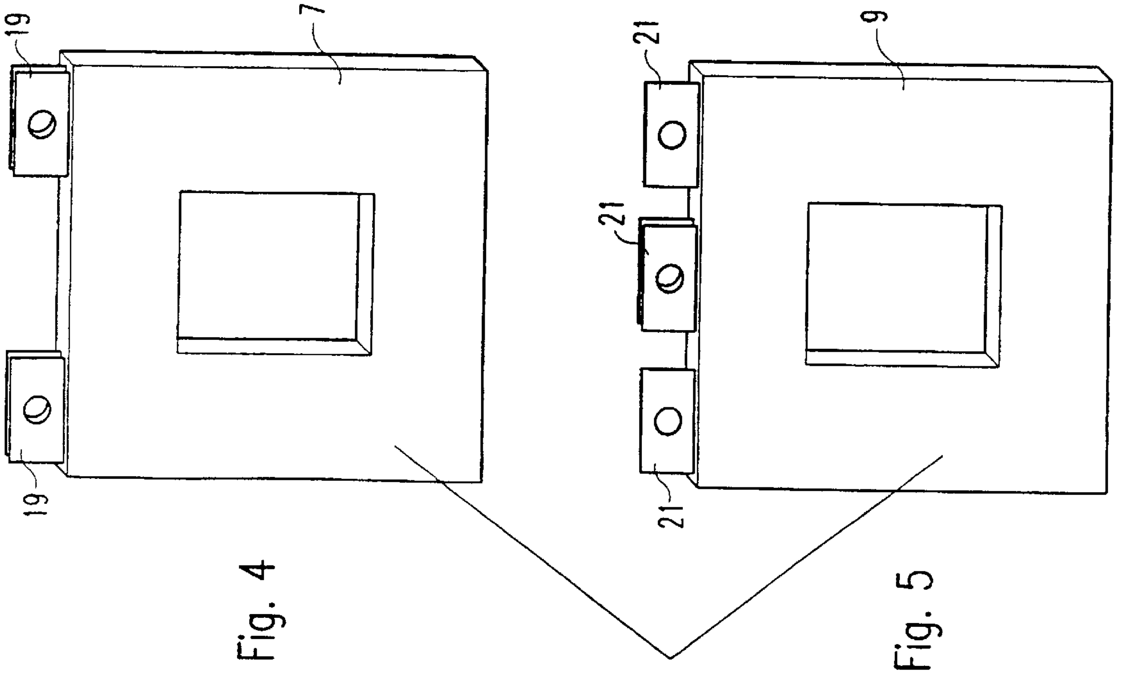
Fig. 4
Fig. 5

Fig. 6a
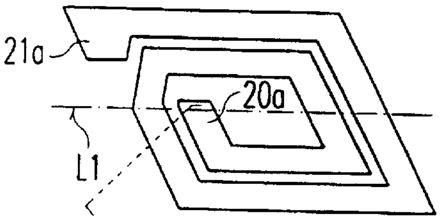
Fig. 6b
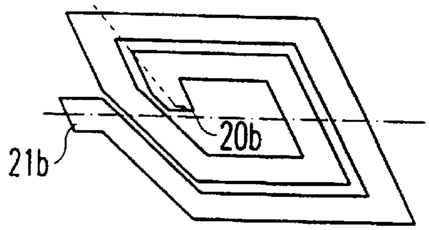
Fig. 6c
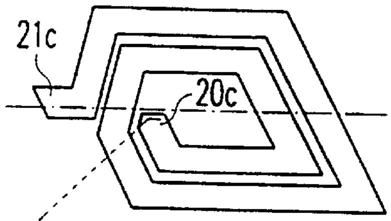
Fig. 6d
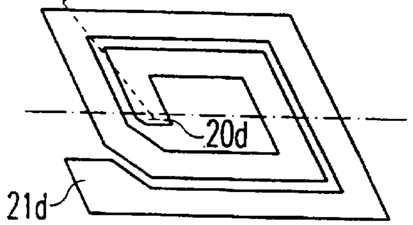
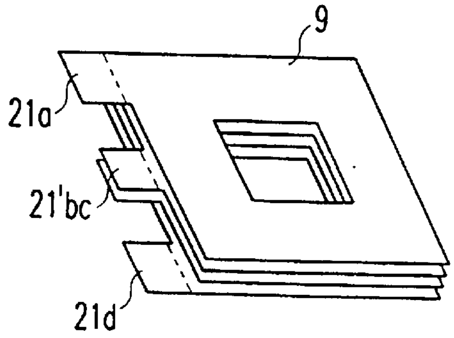
Fig. 6e
Fig. 6f
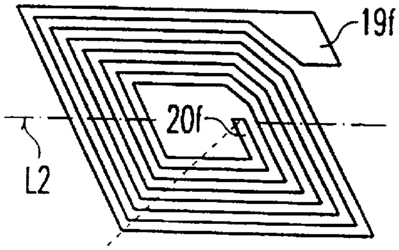
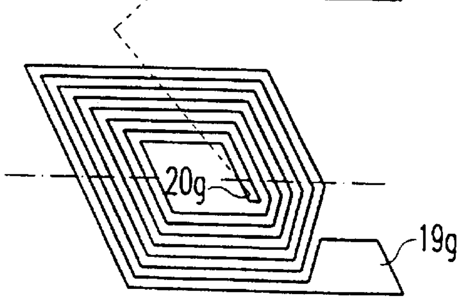
Fig. 6g
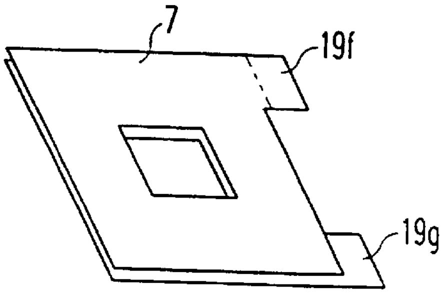
Fig. 6h

POWER TRANSFORMER FOR A SWITCHED MODE POWER SUPPLY, ESPECIALLY FOR STUD WELDING DEVICES

The invention relates to a power transformer for a switching power supply, particularly for stud welding devices according to the preamble of claim 1, and a switching power supply comprising a power transformer.

Known power transformers of this kind for switching power supplies as used for example in stud welding engineering have to be capable of giving off a power output of several kW, e.g. up to 50 kW. Owing to this high output, known power transformers are heavy and have large dimensions. As the power transformers usually determine the dimensions as well as the weight of switching power supplies for the most part, such switching power supplies have the disadvantage that they are unwieldy because of the largeness of their structure and because of their weight. Furthermore, as a result of their large size, such power transformers have a relatively high power dissipation in the core (hysteretic losses) and in the windings (ohmic losses) when operating and are expensive to manufacture because of their size required.

Moreover, all the peripheral components of a switching power supply having a known power transformer have to be designed for very high outputs because of the relatively high losses of the power transformer. For this reason, the construction of such a switching power supply is expensive and complex.

The object of the present invention is to provide a power transformer which has lower losses when operating, which is constructed to be lighter and smaller and which can be manufactured in an easy and cost-efficient way, and a switching power supply comprising such a power transformer.

According to the invention, the object is achieved with the features of claims 1 and 10.

Further advantageous embodiments of the invention are apparent from the subclaims.

In the following, the invention is described by means an embodiment shown in the drawings, in which:

FIG. 4 is a perspective view of a primary package;

FIG. 5 is a perspective view of a secondary package;

Figure 1:
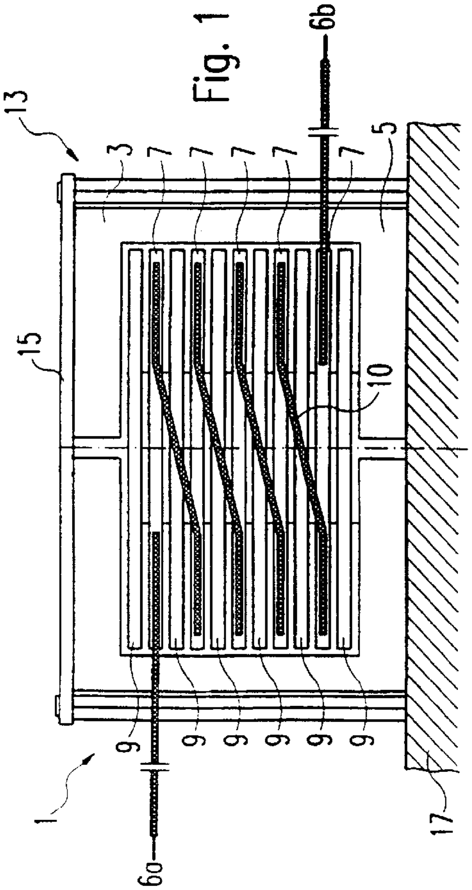
FIG. 1 is a front view of a power transformer comprising primary packages connected up in series.
Figure 9:
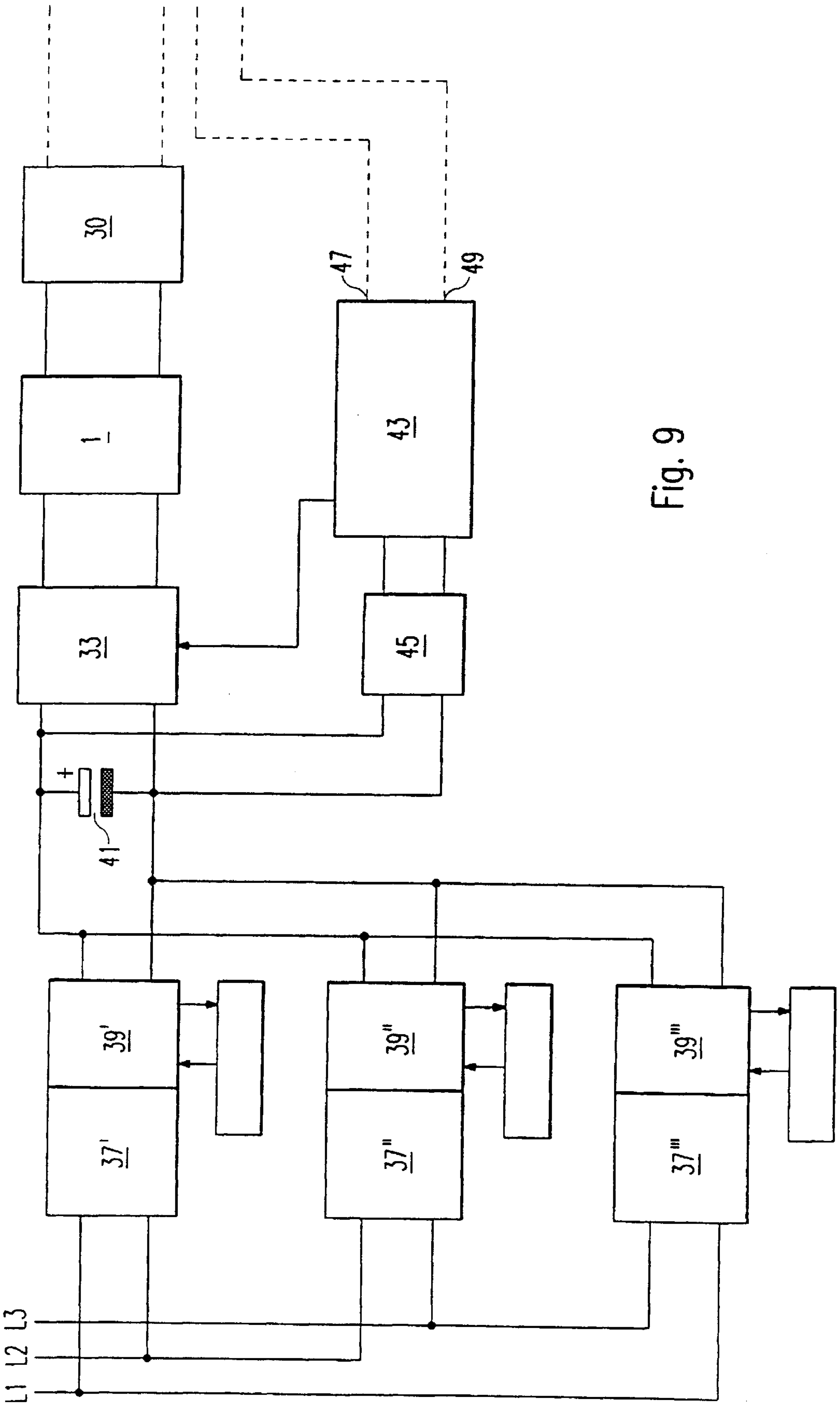
Figure 11:
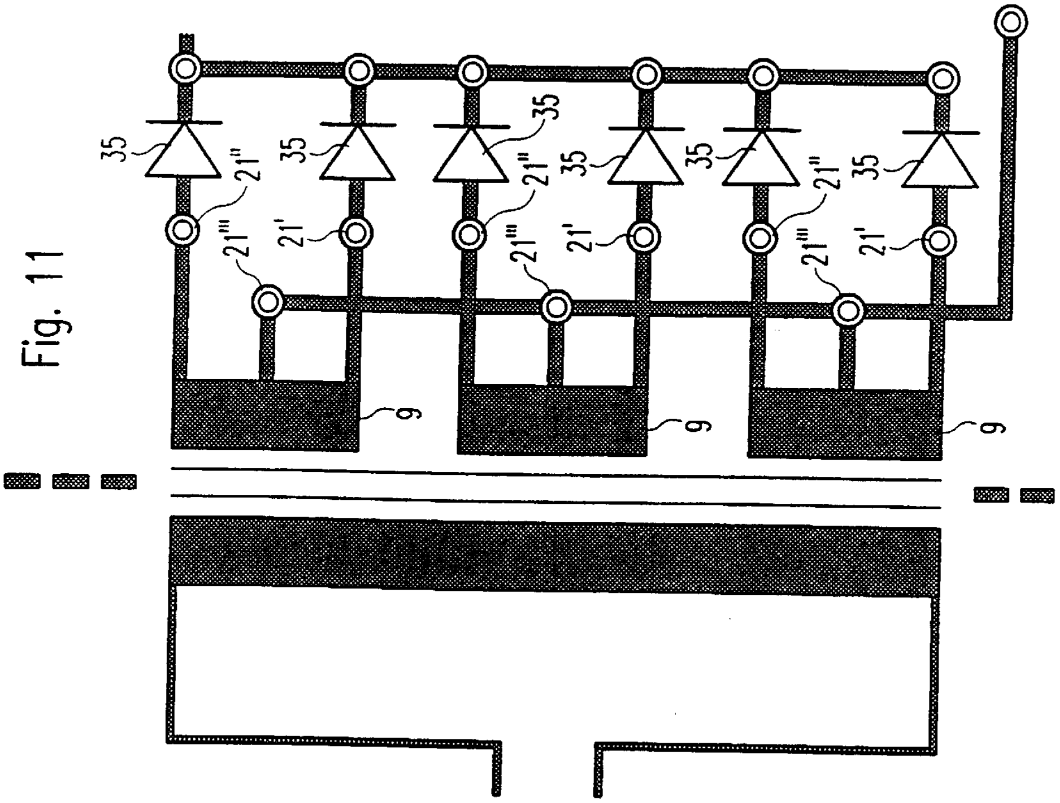
Figure 10:
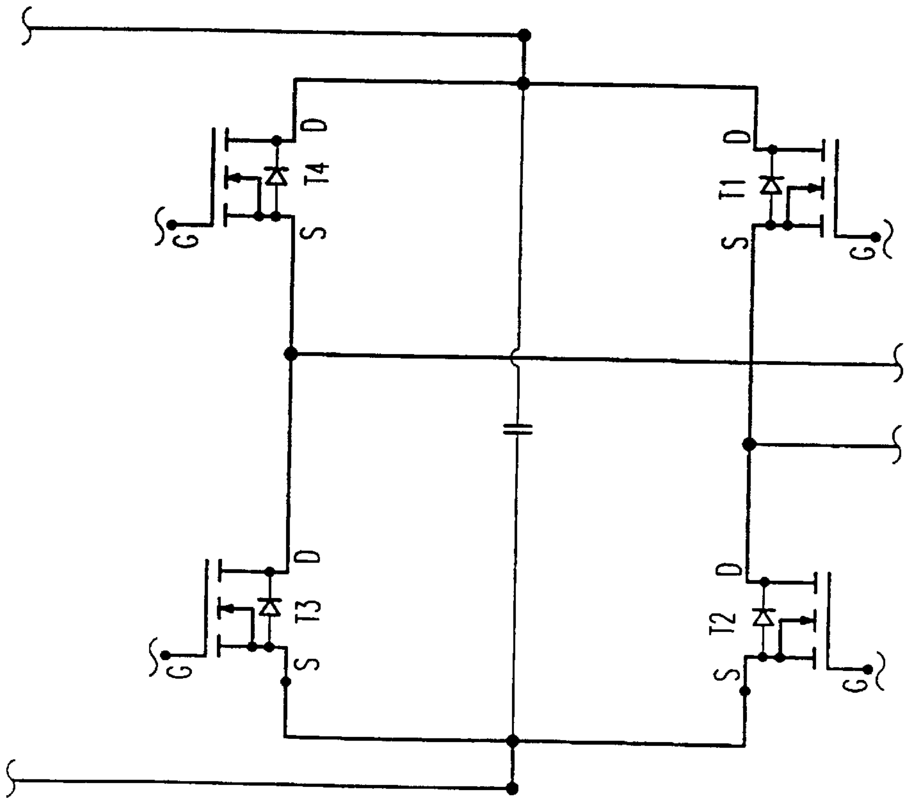
Figure 12A:
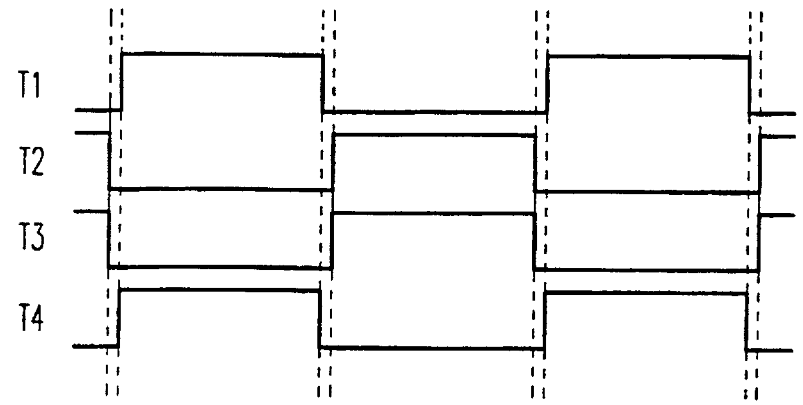
Figure 12B:
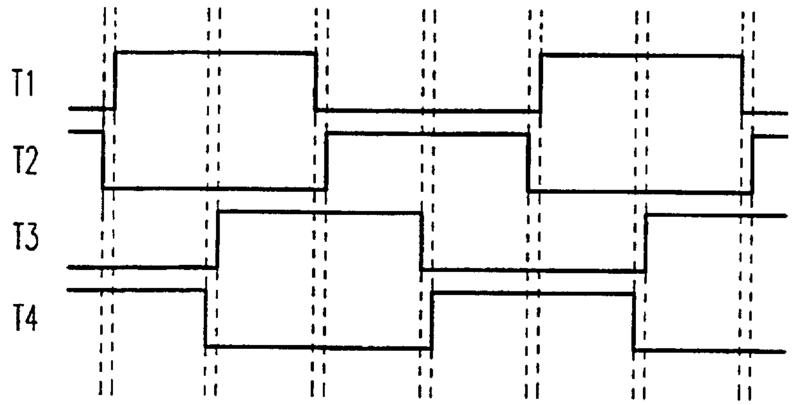
Figure 12C:
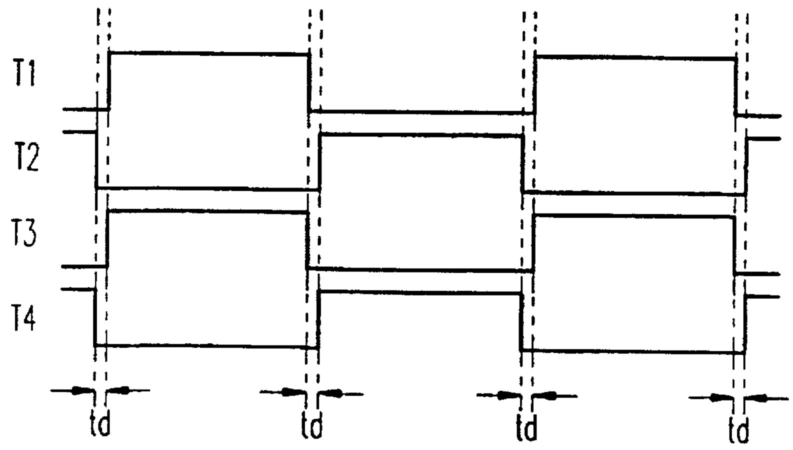

FIGS. 6*a*–6*e* are a perspective view of the details and the structure of the secondary package shown in FIG. 5;

FIGS. 6*f*–6*h* are a perspective view of the details and the structure of the primary package shown in FIG. 4;

FIG. 7 is a side view of one half of a ferrite core employed in the power transformer shown in FIG. 1;

FIG. 8 is a plan view of one half of the ferrite core according to FIG. 7;

FIG. 9 is a schematic connection diagram of a switching power supply comprising a power transformer as shown in FIG. 1;

FIG. 10 is a detailed connection diagram of an inverter according to FIG. 5;

FIG. 11 is a detailed connection diagram of the power transformer according to FIG. 5 followed by a rectifier and FIGS. 12*a*–12*c* is a diagrammatic illustration of different loads acting on the inverter according to FIG. 10.

Figure 2:
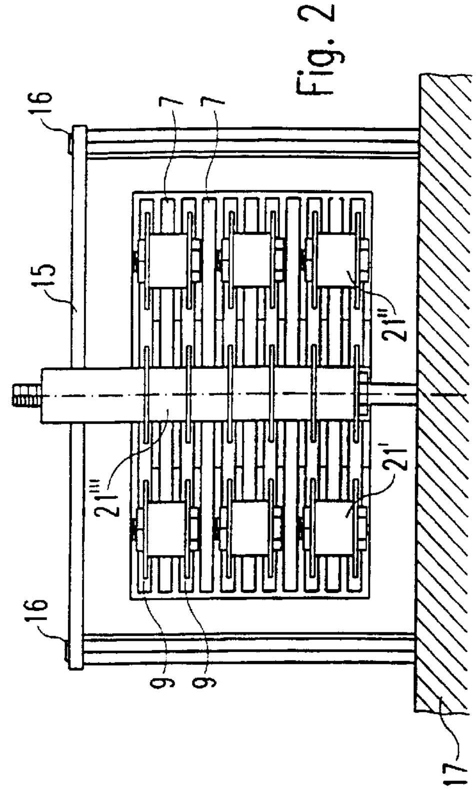
FIG. 2 is a rear view of a power transformer as shown in FIG. 1 comprising secondary packages connected up in parallel.
Figure 3:
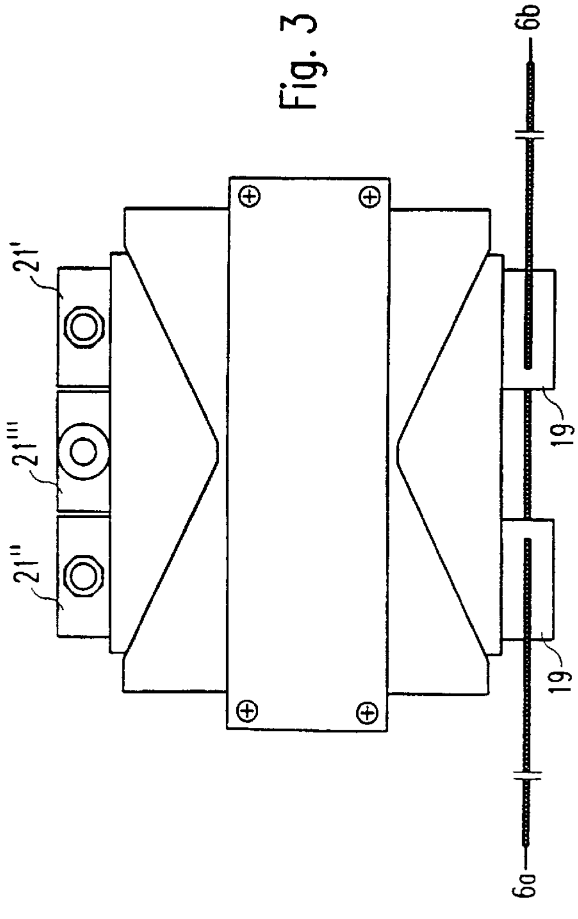
FIG. 3 is a plan view of a power transformer as shown in FIG. 1.

The power transformer 1 shown in FIG. 1 to FIG. 3 comprises a ferrite core consisting of an upper half 3 and a lower half 5 configured to be mirror-symmetrical to the upper half, which are shown as an individual part in FIGS. 7 and 8. On the inside, this ferrite core encloses primary and secondary packages 7, 9, which are alternately stacked horizontally, like a ring. The packages lying in parallel horizontal planes are penetrated vertically in the middle by a yoke 11 of the ferrite core only shown by a dotted line in FIG. 1. As apparent from FIG. 7 and FIG. 8, one half 3, 5 of the ferrite core consists of a yoke 11 in the center having the form of a square parallelepiped, from which opposed L-shaped legs 12*a*, 12*b* extend on both sides along the axis of the base of the square parallelepiped. In a plan view, these legs 12*a*, 12*b* of a section of an isosceles triangle widen up to their outer sides 14*a*, 14*b*, which lie in one plane parallel to the axes A, B and extend perpendicularly up to the height of the square parallelepiped, forming a U-shape. If the upper and lower halves 3, 5 are evenly placed one on top of the other, so both U-shaped halves close to form a ring, the ferrite core will thus enclose the packages 7, 9 like a ring, with the yoke 11 of the ferrite core penetrating the packages 7, 9 perpendicularly.

The inclined mid-portion 10 shown in FIG. 1 is only to indicate schematically that e.g. two superimposed primary packages 7, respectively, may be electrically connected with each other. Of course, it is also conceivable to connect secondary package with each other the same way.

In the preferred embodiment, all primary packages 7 are connected up in series, so, advantageously, a total winding having a beginning 6*a* and an end 6*b* and a large number of turns is obtained.

The secondary packages 9, however, may be connected up in parallel in respectively superimposed pairs, so e.g. three pairs connected up in parallel are obtained. By this, the high current required on the secondary side can be divided into thirds in the transformer 1, so, advantageously, the conductor cross section required for high current in a secondary package 9 can be reduced accordingly, too.

In order to house the largest possible number of secondary packages 9 in the transformer 1, a secondary package 9 may be provided as the bottom and the top layers. This has a further advantage, namely, that of a better insulating strength, as in this case, no primary package will directly lie on the inner surface of the ferrite core with its top and bottom surface.

The two halves 3, 5 of the ferrite core are held tensioned by a tensioning device 13, which usually consists of an upper and a lower rectangular plate 15, 17 which are connected with each other via screws or bolts 16 in the corners thereof. For this purpose, the plates 15, 17 project in the longitudinal direction from the dimensions of the ferrite core halves 3, 5 on both sides thereof, and at least one of the plates 15, 17 may also be formed as a cooling body or a tension spring.

The primary and secondary packages 7, 9 shown as details in FIGS. 4 and 5 have the same rectangular ring shape, with both packages 7, 9 having terminal lugs 19, 21 projecting from one side thereof. The terminal lugs 19 of the primary package 7 are positioned in the two corners of one side, and the terminal lugs 21 of the secondary package 9 are positioned not only in the two corners but also additionally in the middle of one side.

As apparent from FIGS. 6*a* to 6*h*, this rectangular ring shape with the terminal lugs 19, 21 projecting from the rectangle is formed by superimposing several rectangular spirally wound lamellae as shown in FIGS. 6*a* to 6*d* and FIGS. 6*f*, 6*g*.

As viewed from the top, the secondary lamella shown in FIG. 6*a* begins with a widened starting portion 21*a* at one corner serving as a terminal lug 21 and leads to the inside as a web of constant thickness of e.g. 0.2 to 0.4 mm and constant width of e.g. 6 to 15 mm, forming a right-handed helix bent at a right angle, respectively. The end 20*a* of the helix is positioned e.g. on the same side as the starting portion 21*a* and extends beyond the middle of the side. The corner between the starting and the end portions 21*a*, 20*a* of the helix may be chamfered, resulting in a divergence from an ideal rectangular helix. In this way, the space between the starting and end portions 21*a*, 20*a* can be utilized optimally, too, so an optimal small structure is made possible.

Contrasting to this, as viewed from the top, the secondary lamella shown in FIG. 6 starts with a starting portion 21*b* in the middle of one side, which serves as a terminal lug 19 and projects from one side at a right angle, and leads to the inside in the form of a left-handed helix with e.g. two turns as a web of constant thickness and width, bent at a right angle, respectively. The end 20*b* of the helix is positioned e.g. on the same side as the starting portion 21*b* and extends up to the middle of the side. The corner between the starting and the end portions 21*b*, 20*b* of the helix may be chamfered, resulting in a divergence from an ideal rectangular helix. In this way, the space between the starting and the end portions 21*b*, 20*b* can be utilized optimally, too, so an optimal small structure is made possible.

If the two lamellae shown in FIG. 6*a* and FIG. 6*b* are superimposed evenly for example, so the starting and end portions 21, 21*b*, 20*a*, 20*b* are positioned on the same side, the end portions 20*a* and 20*b*, which are connected electrically e.g. by soldering or welding, will overlap (dotted line between FIG. 6*a* and FIG. 6*b*).

In principal, the lamellae shown in FIG. 6*c* and FIG. 6*d* correspond to the lamellae shown in FIG. 6*a* and FIG. 6*b*, with the exception that they are rotated about their longitudinal axis L1. If the two lamellae shown in FIG. 6*c* and FIG. 6*d* are superimposed evenly, the end portions 20*c* and 20*d*, which are connected electrically e.g. by soldering or welding, will overlap (dotted line between FIG. 6*c* and FIG. 6*d*). If all four lamellac are superimposed, the end portions 20*a* and 20*b* of the lamellae shown in FIG. 6*a* and FIG. 6*b*, the starting portions 21*b* and 21*c* of the lamellae shown in FIG. 6*b* and FIG. 6*c* and the end portions 20*c* and 20*d* of the lamellae shown in FIG. 6*c* and FIG. 6*d* will overlap. The overlapping starting and end portions can be connected electrically, respectively, by soldering, welding or pressing, so a winding connected continuously of a secondary package 9 having a starting tap 21*a*, a middle tap 21*cd* and an end tap 21*d* is obtained.

The lamella on the primary side shown in FIG. 6*f*, which—as viewed from the top —leads to the inside in a left-handed helix, is configured like the lamella on the secondary side shown in FIG. 6*d*. Compared to the secondary lamellae, however, the web has a smaller thickness and width, as the flow of current in the embodiment is smaller on the primary side and thus the conductor cross-section can be designed to be smaller, too. On the primary side, however, only two lamellae shown in FIG. 6*f* and FIG. 6*g*, which are designed to be congruous and are also rotated in relation to each other along their longitudinal axis L2, are superimposed evenly, for example. The overlapping end portions 20*f* and 20*g* can be connected electrically, respectively, e.g. by soldering or welding (dotted line between FIG. 6*f* and FIG. 6*g*).

As the voltage is to be stepped up and the current is to be stepped down in the embodiment, the primary lamellae have a smaller conductor cross-section but more turns than the secondary lamellae.

In this way, the primary package 7 is obtained on the primary side as shown in FIG. 6*h*, and the secondary package 9 is obtained on the secondary side, as shown in FIG. 6*e*.

Of course, depending on the application of the device and on general requirements, the number of superimposed and connected lamellae and the conductor cross section may vary on the primary side as well as on the secondary side.

These lamellae may consist of a material having a high conductivity, such as copper, and, at least on the secondary side, may be cut out of sheet metal having a thickness of at least 200 $\mu$, preferably 250 $\mu$, e.g. by means of punching, laser cutting, etching, eroding, cutting with a water jet, etc.

As apparent from FIG. 2, a pair of secondary packages may be connected up in parallel by connecting the respective starting portions 21*a* and by connecting the respective starting portions 21*d*, Furthermore, all starting portions 21*bc* of the secondary packages may be connected with each other to form a single middle tap. As illustrated in FIG. 2, this connection is made e.g. using an ordinary clamp consisting of a screw or bolt, a metal distance or contact sleeve and a nut, with the sleeve being positioned between two terminal lugs and the eyelets of the terminal lugs as well as the sleeve being penetrated by the screw or bolt from one side and compressed by the nut acting thereupon from the other side.

By connecting the secondary packages in parallel in this way, a total conductor cross section of 25–50 $mm^2$, preferably 40–50 $mm^2$, effective on the secondary side can be achieved.

As both lamellae and packages 7, 9 are superimposed in layers, both lamellae and packages are surrounded by an insulating means in order to avoid shortcircuiting. This insulation can be adjusted to the voltages in the windings occuring and to the heat that might be generated by the flow of energy. Advantageously, the insulation of the lamellae can thus be configured as a thin insulating layer, e.g. using varnish, welding in thin plastic foil, fibres of cloth etc., as the voltages in the windings are smaller there than at a package. The insulation of the packages, however, must be more powerful, as higher voltages occur here. The packages are therefore e.g. embedded in plastic by injection molding, welded or received in thicker plastic foils or fibres of cloth, etc.

Forming a structure of turns out of primary and secondary lamellae and packages has the particular advantage of a good reproducibility of such turns when manufacturing them (bordering, injection molding).

As illustrated in FIG. 3, the primary and secondary packages 7, 9 are alternately superimposed in such a way that the terminal lugs 19 on the primary side are positioned on one side and the terminal lugs 21 on the secondary side are positioned on the opposing open side of the transformer 1 and project from the ringshaped housing at the side thereof.

FIG. 9 is a schematic view of the circuit of a switching power supply comprising a power transformer 1 of this kind.

On the output side, this power transformer 1 is followed by an output rectifier 30 which, regarding construction, may be arranged directly at the power transformer 1, e.g. at the terminal lugs 21 on the secondary side or the above-mentioned parallel connection thereof, or as close to the power transformer 1 as possible, In this way, line losses can be minimized.

On the input side, the power transformer 1 is supplied with an alternating current of a high frequency or an a-c voltage of a high frequency by an inverter 33. Here, the frequency reaches 100 kHz or more. Of course, the ferrite core of the power transformer 1 has to be designed such that it can transform this high frequency, too. This is guaranteed by using special ferrite, for example.

On the secondary side, the e.g. three pairs of packages 9 shown in FIG. 11 are respectively connected with their winding ends or corner lugs 21', 21" to one anode of a power rectifier diode 35 whose cathodes are connected with each other ($1^{st}$ pole). In this way, with the middle taps 21'" of the pairs of packages 9 ($2_{nd}$ pole), which middle taps are connected with each other, too, a triple rectifier with a rectification with a common reference point is realized, which simultaneously guarantees a double rectification and a division of the current flowing through.

On the input side, in the switching power supply, the three phases L1, L2, L3 of a three-phase current are rectified in three independent input rectifiers 37', 37", 37'". In order to guarantee a stable voltage, each input rectifier may additionally contain a voltage stabilizing circuit, e.g. in the form of a power factor corrector 39', 39", 39'" (PFC) known in other switching power supplies, but not in switching power supplies of this kind. With the aid of this PFC, it is possible to maintain a stable and uniform voltage after input rectification even in case of different mains supplies (e.g. USA). Moreover, with the aid of such a PFC, which advantageously is only loaded with one third of the required power input like the input rectifier, respectively, it is also possible to reduce or completely avoid a feedback on the mains supply, harmonics, etc., and furthermore to improve the properties regarding electromagnetic compatibility (EMC).

The voltage connected in parallel after input rectification is applied to the inverter 33 as a d.c. voltage once it has been smoothed by means of a capacitor 41 (electrolytic capacitor). As shown in FIG. 10, the inverter is advantageously configured to be a transistor bridge circuit having four transistors T1–T4, whose bridge voltage is applied to the ends of the primary winding of the power transformer 1.

With this structure and potentially additional transistors connected in parallel with each individual transistor, it is possible by means of current division to use standard transistors in spite of a high power required.

As illustrated in FIG. 12*a* to FIG. 12*c*, by means of a phase shift of the through-connection of the diagonal branches T1–T3, T2–T4, as a result of a variation of amplitude in width of the bridge signal, the power transformer can be controlled depending on voltage and on current—with the clock frequency remaining un-changed—and can thus supply the desired voltage and the desired current at the output of the switching power supply.

For this purpose, the phase shift of the through-connection of the diagonal branches T1–T3 and T2–T4 can be controlled by a control logic 43 depending on a current or voltage tap 47, 49 at the output side supplied to this control logic. Here, the current may be tapped e.g. at the welding electrode, as usual.

FIG. 12*a* to FIG. 12*c* are schematic views of the respective switching behaviour of transistors T1–T4 required for different loads.

In FIG. 12*a*, for example, the case of a load "0%" is illustrated. As apparent, both the signals of transistors T1–T3, T2–T4 of the diagonals and the signals of transistors T1–T2, T3–T4 of the vertical are in an inverse modus. In this way, the same potential is applied to the transistor bridge i.e. at the tap between transistors T1 and T2 and the tap between transistor T3 and T4, without a through-connection being made and a short circuit being caused by the verticals T1–T2 and T3–T4.

Contrasting to this, FIG. 12*b* shows the case of a load "50%". As apparent, this results from a phase shift of −90° (T3, T4 to T1, T2) compared to FIG. 12*a*. As illustrated, both the signals of transistors T1–T3, T2–T4 of the diagonals overlap by 50% and the signals of transistors T1–T2, T3–T4 of the vertical are still in a push-pull modus. In this way, a signal with half the width of amplitude is applied to the transistor bridge, i.e. at the tap between transistor T1 and T2 and the tap between transistor T3 and T4, without a through-connection being made and a short circuit being caused by the verticals T1–T2 and T3–T4.

In FIG. 12*c*, however, the case of a load "100%" is illustrated. As apparent, this results from a phase shift of −180° (T3, T4 to T1, T2) compared to FIG. 12*a*. As illustrated, the signals of transistors T1–T3, T2–T4 of the diagonals overlap by 100% and the signals of transistors T1–T2, T3–T4 of the vertical are still in a push-pull modus. In this way, a signal with full width of amplitude is applied to the transistor bridge, i.e. at the tap between transistor T1 and T2 and the tap between transistor T3 and T4, without a through-connection being made and a short circuit being caused by the verticals T1–T2 and T3–T4.

Moreover, between the switching operations, a delay time $t_d$ may be adjustably provided, respectively. With this delay time $t_d$, the rise time and the turn-off time of a transistor T1–T4 can be taken into consideration, so a through-connection by the vertical branches due to overlapping switching from T1 to T2 or from T3 to T4 can be avoided. Furthermore this delay time guarantees that the same potential will be applied to a transistor T1–T4 at the point of time of switching. A potential difference at transistor T1–T4 present without a delay time $t_d$ may be balanced during the delay time $t_d$ via the diode junction existing in a transistor, e.g. a field effect transistor. In this way, the transistors are loaded to a smaller extent, which has a positive effect on their lifetime.

Instead of the illustrated inversion by means of the phase shift method with constant frequency, it is of course also conceivable to use other methods of inverting with e.g. a variable high frequency around a working point frequency of 100 kHz or more.

As a result of the high frequency feed of 100 kHz or more to the power transformer 1, which has not been known by now in switching power supplies in stud welding engineering, the power transformer can not only be designed to be smaller and lighter due to smaller losses in the core and the coil, but the entire switching power supply can be optimized with respect to its weight and size without changing the power output.

With the solutions used in input rectification, inversion, transforming and output rectification, it is furthermore possible to use cost-efficient standard components.

Thus, with a switching power supply of this kind, it is possible to reduce the weight of switching power supplies for stud welding, which is otherwise very high, e.g. to less than 20 kg without reducing the required power output of up to 50 kW or more, preferably 60 kW, and to achieve an efficiency of 0.8 to 0.9 and more, e.g. 0.95.

It is also conceivable to use each of the individual components described above, namely, the power transformer, the inverter and the power impedance, individually and independently in other types of application than the one described or to adjust them to other applications.

For example, instead of being used for stepping up the current and for stepping down the voltage as is the case in stud welding engineering, the power transformer can of course also be used in the reverse direction, i.e. for stepping up the voltage and for stepping down the current.

What is claimed is:

1. A power transformer for a switching power supply, particularly for a stud welding device, comprising:

a closed ring shaped core having a primary winding and a secondary winding thereon;

said primary winding further including a plurality of primary packages (7), each said primary package having at least one primary lamella including a primary electrical conductor wound in one plane, said primary packages electrically connected in series;

said secondary winding further including a plurality of secondary packages (9) of quantity at least one more than said plurality of primary packages, each said secondary package having at least one secondary lamella including a secondary conductor wound in one plane, and further wherein at least two of said secondary packages are connected in parallel and further include terminals arranged to permit selected of different output voltages and currents from said secondary winding; and wherein:

said primary packages (7) and said secondary packages (9) are arranged in alternating parallel fashion wherein a first secondary package defines a topmost package and a last secondary package defines a bottommost package.

2. A power transformer according to claim 1, wherein said ring-shaped core contains a yoke (11) which penetrates the packages (7, 9) perpendicularly to their plane and substantially fills an inner space inside the packages.

3. A power transformer according to claim 2, wherein said yoke (11) forms the center line of said ring.

4. A power transformer according to claim 1 wherein said primary packages (7) and said secondary packages (9) are configured to be ring-shaped.

5. A power transformer according to claim 4, wherein said packages (7, 9) are configured to be rectangular.

6. A power transformer according to claim 1 wherein said primary and secondary lamellae are configured to be a left-handed or a right-handed helix.

7. A power transformer according to claim 1 wherein said primary package (7) contains two terminal lugs (19*f*, 19*g*), with several primary lamellae being connected up in series.

8. A power transformer according to claim 1 wherein said secondary package (9) contains three terminal lugs (21*a*, 21*bc*, 21*d*), with several secondary lamellae being connected up in series.

9. A power transformer according to claim 1 wherein several secondary packages (9) are connected in parallel with each other via terminal lugs (21*a*, 21*d*).

10. A power transformer according to claim 1 wherein two superimposed secondary packages, respectively, are connected in parallel via terminal lugs (21*a*, 21*d*) to form one pair.

11. A power transformer according to claim 9, wherein the central terminal lugs (21*bc*) of several packages are connected with one another.

12. A power transformer according to claim 1 wherein several primary packages are connected up in series via terminal lugs (19*f*, 19*g*).

13. A power transformer according to claim 1 wherein said packages (7, 9) are embedded in plastic by injection molding.

14. A switching power supply comprising:

a power transformer, said transformer having a closed ring shaped core, and a primary winding and a secondary winding about said core;

said primary winding further including a plurality of primary packages (7), each said primary package having at least one primary lamella including a primary electrical conductor wound in one plane, said primary packages electrically connected in series;

said secondary winding further including a plurality of secondary packages (9) of quantity at least one more than said plurality of primary packages, each said secondary having at least one secondary lamella including a secondary conductor wound in one plane, said secondary packages connected in parallel and further having terminals arrange to permit selected output voltages and currents from said secondary winding; and wherein:

said plimary packages (7) and said secondary packages (9) are arranged in alternating parallel fashion wherein a first secondary package defines a topmost package and a last secondary package defines a bottommost package an input rectifier (37', 37", 37'"), said rectifier electrically coupled to a power input side of said transformer such that each phase of electrical power input to said transformer passes through said rectifier;

an inverter (33) between said transformer and said rectifier and electrically coupled therebetween; and an output rectifier (30), said output rectifier electrically coupled to a power output of said transformer such that all power output from said transformer passes through said output rectifier prior to use by a user.

15. A switching power supply according to claim 14, wherein said output rectifier (30) is structurally arranged at the power transformer (1).

16. A switching supply according to claim 14 wherein said inverter (33) supplies the power transformer (1) with pulsed signals with a frequency of 100 kHz or more.

17. A switching power supply according to claim 14 wherein said inverter (33) is configured to be a transistor bridge having four transistors (T1, T2, T3, T4).

18. A switching power supply according to claim 17, wherein each transistor (T1, T2, T3, T4) is connected in parallel with at least one additional transistor.

19. A switching power supply according to claim 14 wherein said inverter (33) is supplied with pulsed signals with a frequency of 100 kHz or more via a control logic.

20. A switching power supply according to claim 14 wherein between the switching operations of the diagonal branches (T1–T3, T2–T4) of said inverter, a delay time $t_d$ is provided, and the same potential is applied to one transistor (T1, T2, T3, T4) during the switching operation.

21. A switching power supply according to claim 14 wherein said input rectifier (37', 37", 37'") contains a PFC circuit (39', 39", 39'") in order to guarantee a stable voltage.

* * * * *